May 17, 1949.　　　　J. R. CHRYST　　　　2,470,290
SAW GRINDER

Filed May 6, 1947　　　　　　　　　　　　　4 Sheets-Sheet 1

INVENTOR.
JOHN RUSSELL CHRYST
BY
Munn, Liddy & Glaccum
ATTORNEYS

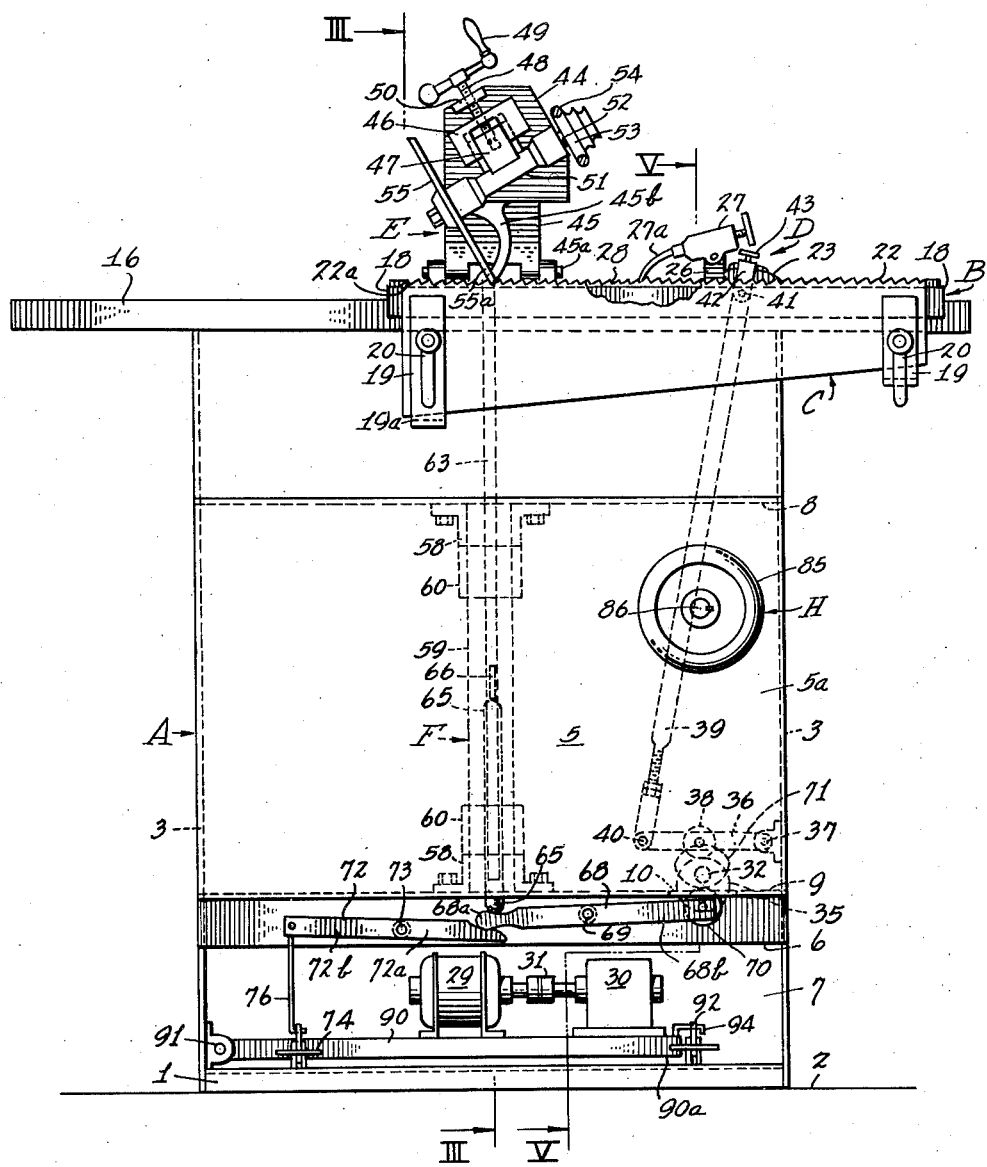

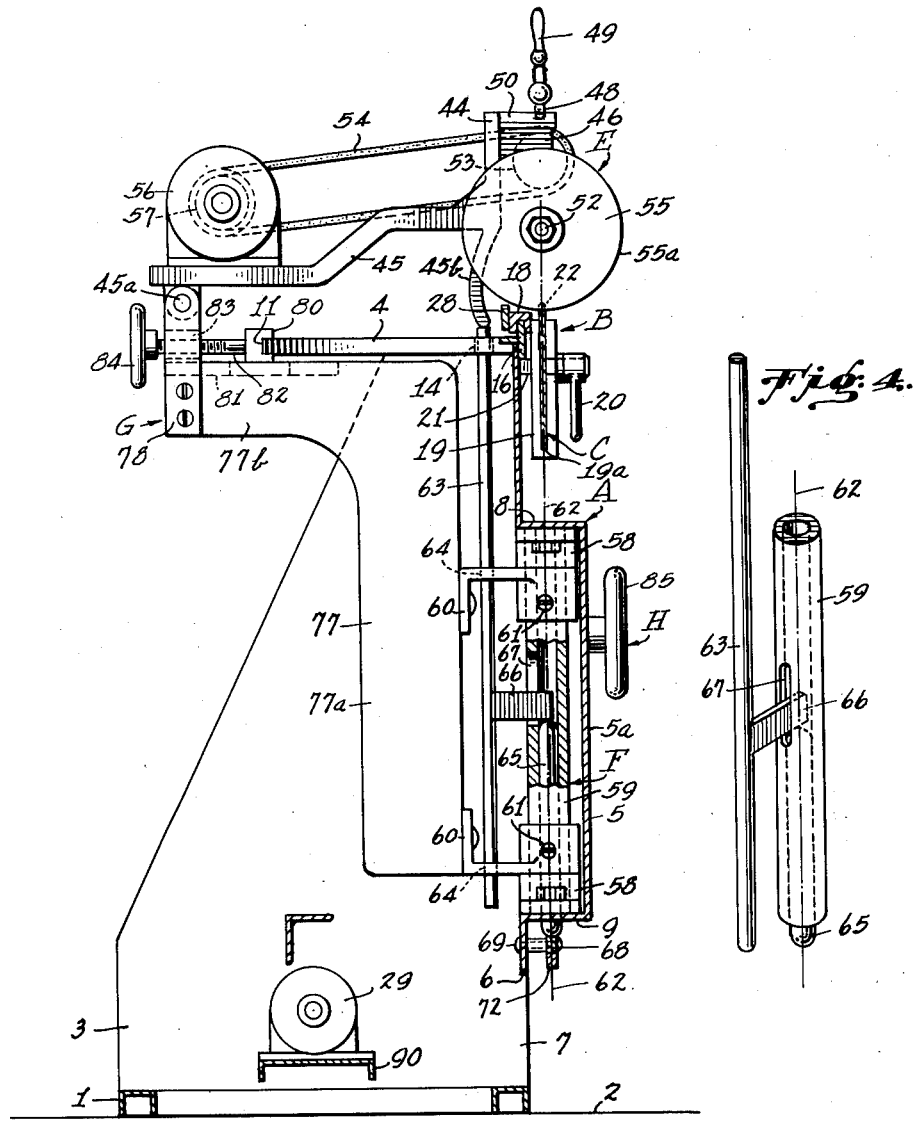

May 17, 1949.  J. R. CHRYST  2,470,290
SAW GRINDER

Filed May 6, 1947  4 Sheets-Sheet 4

INVENTOR
JOHN RUSSELL CHRYST
BY Munn, Liddy & Glaccum
ATTORNEYS

Patented May 17, 1949

2,470,290

UNITED STATES PATENT OFFICE 2,470,290

SAW GRINDER

John R. Chryst, Tacoma, Wash.

Application May 6, 1947, Serial No. 746,299

6 Claims. (Cl. 76—40)

The present invention relates to improvements in a saw grinder; and it consists of the combinations, constructions and arrangement of parts hereinafter described and claimed.

An object of my invention is to provide a saw grinder that is adapted to grind the teeth of a saw with rapidity, and which will result in shaping all of the teeth uniformly. It is further proposed in this invention to mount the grinding wheel in such a manner that it can be moved into various angular positions relative to the saw. This arrangement will permit different angles of cross bevel to be ground on the saw teeth.

More particularly described, I provide a swingable mechanism on which the grinding wheel is mounted. The wheel is movable into tooth-grinding position and also out of contact with the saw. The motion for lifting the wheel into non-grinding position is transmitted along the axis on which the swingable mechanism turns. This axis, when extended, passes through the point of contact between the grinding wheel and the tooth of the saw being ground. Accordingly, the wheel may be swung so as to grind different angles of cross bevel on the saw teeth without changing the point of contact between the wheel and the saw tooth.

Another object of my invention is to provide a saw grinder that is compact in construction, durable and efficient for the purpose intended.

Other objects and advantages will appear as the specification continues, and the novel features will be set forth in the appended claims.

For a better understanding of the invention, reference should be had to the accompanying drawings, forming part of this application, in which:

Figure 2 is a front elevation of the same saw grinder;

Figure 3 is a vertical transverse sectional view taken along the line III—III of Figure 2;

Figure 4 is an isometric view of a hollow shaft, push and lift rods that I employ;

While I have shown only the preferred form of my invention, it should be understood that various changes, or modifications, may be made within the scope of the claims hereunto annexed without departing from the spirit thereof.

In carrying my invention into practice, I provide a frame indicated generally at A. This frame has a saw carriage B movably mounted thereon, in which a saw C may be clamped. A saw-advancing mechanism D periodically advances the saw stepwise beneath a tooth-grinder indicated at E. A grinder wheel-elevating mechanism F raises the grinding wheel out of contact with the saw during the periods in which the saw is being advanced. The grinder E is mounted on a swingable support G, which may be adjusted into various angular positions to change the angle of cross bevel on the saw teeth. A mechanism H is provided for adjusting the machine to the first tooth on the saw. These units will be described in order.

Frame construction

Figure 1:
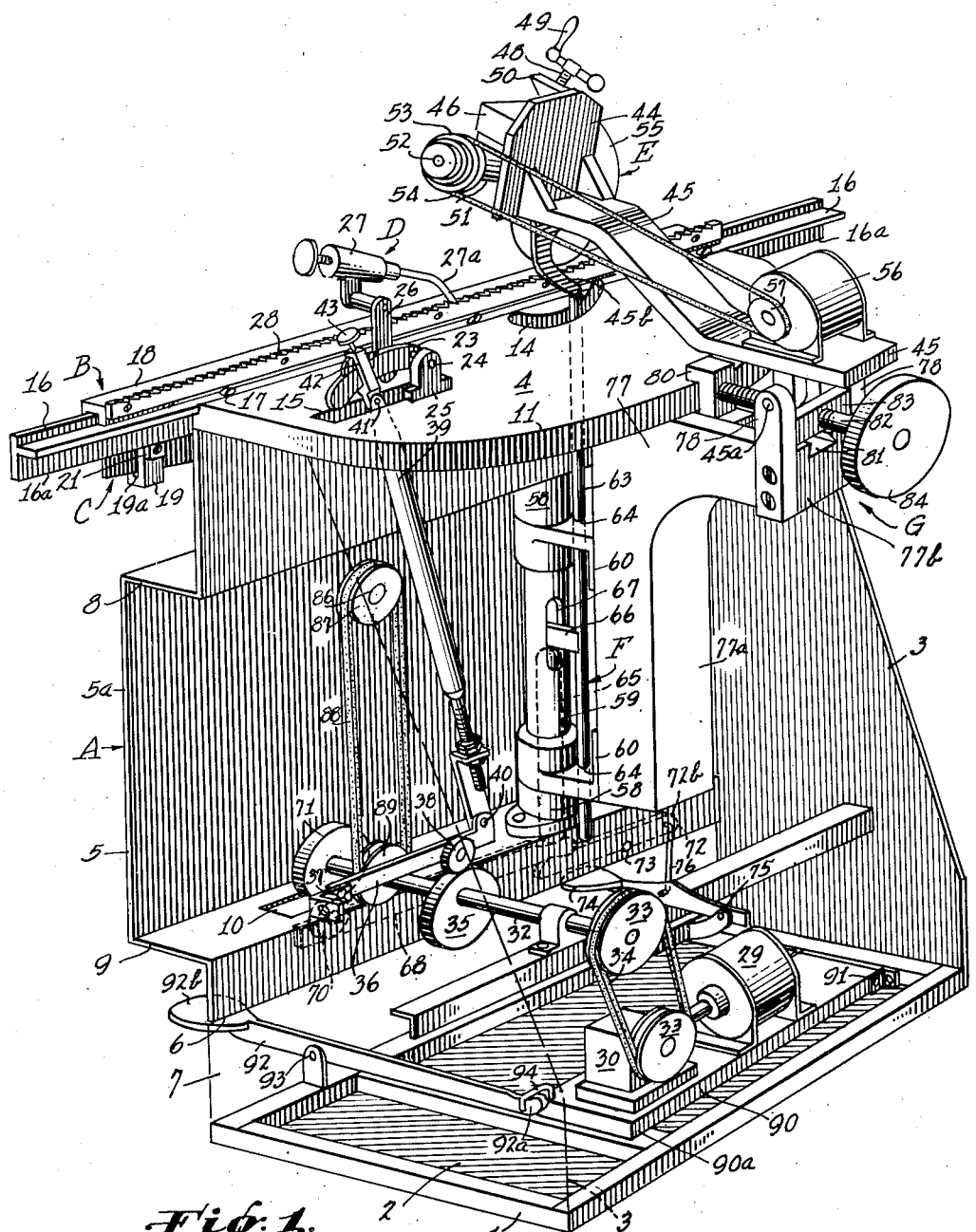
Figure 1 is a perspective view of my saw grinder, looking from the back thereof, one of the end plates being removed.

The frame A includes a substantially rectangular-shaped base 1, which rests on a suitable foundation 2. Spaced-apart end plates 3 are secured to the base and support a top 4 at their upper ends. A front plate 5 is secured to the end plates 3 and the top 4, and has its lower edge 6 spaced above the base 1. This arrangement provides a slot 7 extending across the front lower portion of the machine, as indicated in Figures 1 and 2.

It will be noted that the front plate is fashioned with an offset portion 5a that provide horizontal upper and lower ledges 8 and 9, respectively, which extend throughout the width of the machine. The lower ledge is slotted, as at 10, for the purpose hereinafter set forth.

Figure 6:
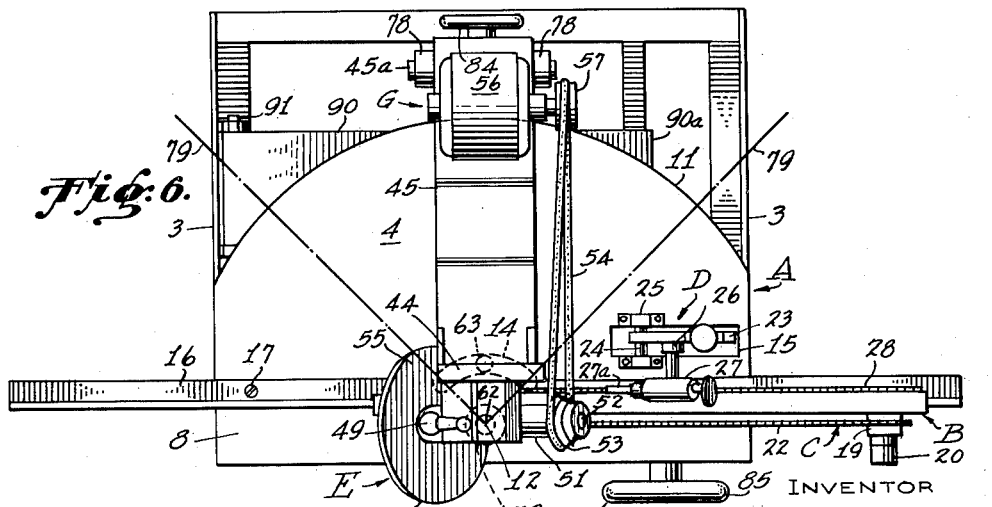
Figure 6 is a top plan view of my saw grinder.

The top 4 has a curved rear edge 11 with the center of curvature located at point 12 (see Figure 6). An arcuate slot 14 is formed in the top concentric with the edge 11; and the top also is provided with a straight slot 15. The latter accommodates operating parts of the saw-advancing mechanism D, as will be described later.

Saw carriage

The saw carriage B includes a rail 16 that is secured to the top 4 by any suitable means, such as screws 17 (see Figure 1). This rail is T-shaped in transverse section and extends laterally beyond the end plates 3. A slide 18 is moveable along the rail 16, and is provided with slotted arms 19. The saw C fits into the slots 19a of these arms and clamps 20 secure the saw in place.

In order to prevent the slide from disengaging itself from the rail 16, I have shown retainers 21 projecting rearwardly from the arms 19 and riding on the underneath edge 16a of the rail. It is obvious that any other suitable means could be employed for holding the slide against disengagement from the rail. As the slide moves across the machine, it carries the saw C therewith, and the saw is moved underneath the grinder E.

Saw-advancing mechanism

The saw advancing mechanism D advances the saw stepwise, and the teeth 22 on the saw are ground during periods of rest of the slide 18 and the saw C. In Figure 1, I disclose a rocking arm 23 that is pivotally mounted on a shaft 24, the latter being supported in bearings 25. An arm 26 is fixed to the rocking arm 23, and swingably supports an index mechanism 27. The latter has an index finger 27a that engages with a rack bar 28 secured to the slide 18. Each time the arm 23 is raised, the finger 27a will advance the slide 18 and the saw C.

Figure 5:
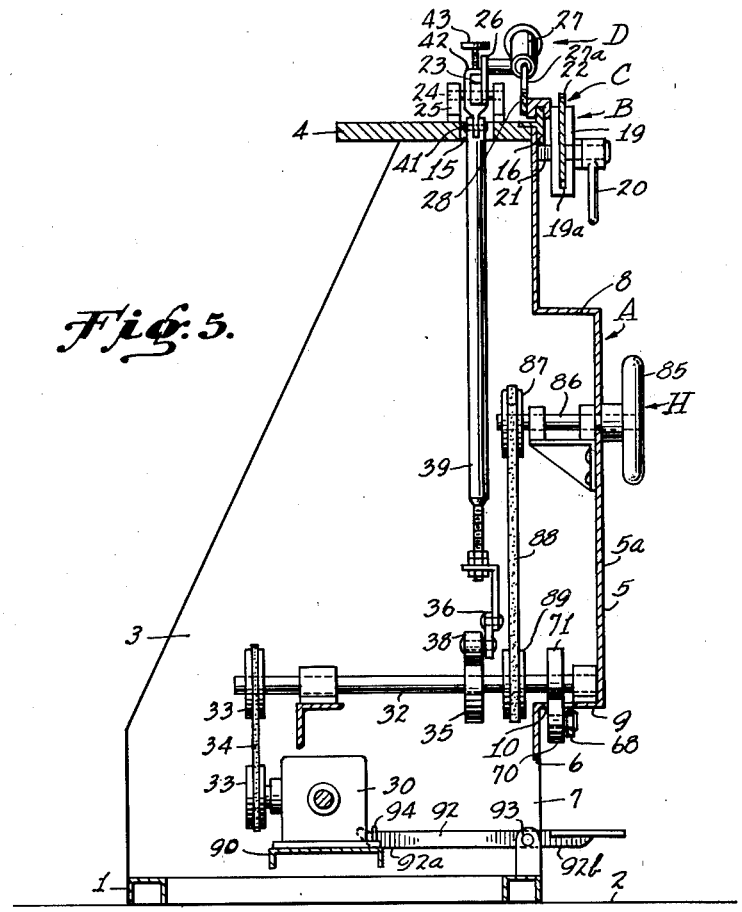
Figure 5 is a vertical transverse section through the machine, the view being taken along the line V—V of Figure 2.

The mechanism for oscillating the swinging arm 23 is clearly shown in Figures 1, 2 and 5 of the drawings. A motor 29 is connected to a gear reduction unit 30 by a flexible coupling 31. This unit drives a shaft 32 through pulleys 33 and a belt 34. An eccentric or cam 35 is secured to the shaft 32 and is rotated thereby. A lever 36 is pivoted at 37 and carries a roller 38, the latter riding on the eccentric 35. As the eccentric revolves, the lever 36 oscillates up and down and this motion is transmitted to an index lift rod 39, the latter being pivoted to the lever 36, as at 40.

The upper end of the index lift rod passes through the slot 15 and is hinged at 41 to a sliding lock 42 (see Figures 1, 2 and 5). This lock is adjustably fastened to the swinging arm 23, and may be secured in adjusted position by a screw 43. The latter allows the sliding lock to be moved along the arm 23 to adjust the stroke of the index finger 27a.

Tooth grinder

The tooth grinder E is supported by a grinder head 44 formed on the forward end of a swingable platform 45. The latter swings about a hinge pin 45a. The head is provided with an inclined guideway 46 in which a slide 47 is disposed. The slide may be adjusted along the guideway by means of a threaded shaft 48 and a crank 49. The shaft 48 is threaded through a lug 50 projecting from the grinder head (see Figure 2).

The slide 47 carries a sleeve 51, in which a shaft 52 is rotatably mounted, this shaft being driven by a pulley 53 and belt 54. A grinding wheel 55 is secured to the shaft 52 and is inclined with respect to vertical, as shown in Figure 2. The rim 55a is employed for grinding the teeth 22 on the saw C. The depth of grinding is controlled by adjusting the threaded shaft 48. The platform carries a motor 56, and the latter has a pulley 57 that drives the belt 54.

The platform 45 has a lift foot 45b projecting downwardly therefrom. When this foot is elevated, the wheel 55 is moved out of contact with the saw C.

Wheel-elevating mechanism

The details of the wheel elevating mechanism F are shown in Figures 1 to 4, inclusive. Bearings 58 are secured to the ledges 8 and 9 of the frame A and a hollow shaft 59 is journalled therein. Brackets 60 are fixed to this hollow shaft by setscrews 61, or other suitable fastening means. These brackets and the hollow shaft are swingable as a unit about the longitudinal axis 62 of the shaft 59 (see Figure 3). This longitudinal axis, when extended, passes through the point 12 (see Figure 6).

A lift rod 63 is mounted in parallel relation with the hollow shaft 59, and is guided for vertical movement by bearings 64 formed in the brackets 60. The upper end of this lift rod passes through the arcuate slot 14 formed in the top 4, and bears against the lift foot 45b. The latter is offset relative to the axis 62 of the hollow shaft.

In order to impart a vertical movement to the lift rod 63, a push rod 65 is slidably disposed in the bore of the hollow shaft 59. A finger 66 is formed integral with the lift rod 63 and extends through a slot 67 formed in the wall of the hollow shaft (see Figures 3 and 4). This finger rests on the top of the push rod 65. Thus upward movement of the push rod will raise the lift rod 63, thereby swinging the platform 45 about its hinge pin 45a. The lift foot 45b transmits the upward movement of the lift rod 63 to the swingable platform 45 which results in moving the grinding wheel 55 out of engagement with the saw C.

A rocker lever 68 is pivoted at 69 to the lower portion of the front plate 5, this portion being below the ledge 9. The arm 68a of this lever engages with the push rod 65, while the arm 68b of the lever carries a roller 70 (see Figure 2). The shaft 32 has a cam 71 fixed thereto, which periodically depresses the roller 70 and thereby swings the rocker lever 68 in a clockwise direction in Figure 2 to elevate the push rod 65. The cam 71 projects through the slot 10 in the ledge 9 while it is depressing the roller 70.

It should be noted that the eccentric or cam 35 is designed to actuate the saw-advancing mechanism D to advance the saw C during the periods of time when the cam 71 has turned to raise the push rod 65. In other words, the grinding wheel 55 is out of contact with the saw when the latter is advancing.

In order to raise the grinding wheel out of engagement with the saw at any time, I have provided a manually actuated lever 72. This lever is pivoted to the front plate, as at 73, and its arm 72a underlies the arm 68a of the lever 68. A foot pedal 74 is pivoted at 75 and has a link 76 connected to the arm 72b of the lever 72. Upon depressing the foot pedal, the lever 72 will swing in a counter-clockwise direction in Figure 2, raising the push rod 65.

Swingable support

The saw grinder has been designed to grind various angles of cross bevel on the front and back faces of the saw teeth. The structure of the swingable support G for accomplishing this result now will be described.

An inverted L-shaped standard 77 has its vertical leg 77a secured to the brackets 60, while its horizontal leg 77b is swingable beneath the top 4 toward the end plates 3. The standard swings about the longitudinal axis 62 of the hollow shaft 59 as a center. A pair of uprights 78 are fixed to the horizontal leg 77b and carry the pin 45a to which the platform 45 is hinged.

Referring to Figure 6, it will be seen that the platform 45 is disposed in a central position at right angles to the plane of the saw C. The standard 77 and the platform 45 may be swung approximately 45° each side of this central position, as suggested by the dot-dash lines 79 in this view and of course, the grinder head 44 and the grinding wheel 55 will swing with the standard 77. The slot 14 in the top 4 is sufficiently long to permit the lift rod 63 to move laterally with the standard and the brackets 60 as they swing through the 90° of adjustment.

Any suitable means may be provided for holding the standard in the position to which it is adjusted. For this purpose, I have disclosed a shoe 80 that is arranged to be moved against the curved rear edge 11 of the top 4. In the drawings, I show the shoe 80 as being moveable in a guideway 81 fashioned in the leg 77b of the standard. A rod 82 is threaded through a bar 83, and the latter is secured to the uprights 78. Hand wheel 84 is provided for operating the rod 82, and thereby moving the shoe 80 toward or away from the curved edge 11 of the top 4. When the shoe is pressed up against the edge 11, the standard 77 will be retained against swinging.

The longitudinal axis 62 of the hollow shaft 59, when extended, passes through the point of contact between the grinding wheel and the tooth being ground. The purpose of this is to allow the grinding wheel to be swung so as to grind the desired cross bevels on the saw teeth without changing the point of contact.

*Mechanism for adjusting machine to first tooth of saw*

In order to bring the first tooth 22a of the saw into proper position with respect to the grinding wheel, (see Figure 2), a mechanism H is provided for accomplishing this adjustment. A hand wheel 85 is located on the outer face of the front plate 5 and is connected by a shaft 86 to a pulley 87 disposed on the inner face of the front plate (see Figure 5). A belt 88 is trained around the pulley 87 and passes around a pulley 89 fastened to the shaft 32.

The drive belt 34 must be slackened so as to allow the shaft 32 to be turned when adjusting the mechanism H. This is accomplished by mounting the main motor 29 and the gear reduction unit 30 on a hinged platform 90. The latter has one end thereof hinged at 91 to the base 1, while its opposite end may be raised by means of a foot-operated lever 92. This lever is pivoted at 93 and has its inner end 92a engaged under a hook 94 projecting from the free end 90a of the platform 90. When the outer end 92b of the lever is depressed, the free end of the platform is raised, thereby slackening the belt 34.

Upon releasing pressure on the end 92b of the lever 92, the weight of the motor 29 and gear reduction unit 30 will swing the platform 90 downwardly again, resulting in tightening the belt 34. Accordingly, the pulleys 33 will drive the shaft 32 so as to operate the saw-advancing mechanism D and the wheel-elevating mechanism F.

*Summary of operation*

Having thus described the various parts of my saw grinder, the operation thereof may be briefly summarized as follows:

As the first step, the operator places the saw C in the carriage B and tightens clamps 20. Next, the operator depresses the outer end 92b of the foot pedal 92 so as to raise the free end 90a of the hinged platform 90 on which the motor 29 and gear reduction unit 30 are mounted. This will slacken the drive belt 34. Then the operator turns the hand wheel 85 in order to rotate the shaft 32 and thus actuate the saw-advancing mechanism D until the first tooth 22a of the saw has been given proper adjustment relative to the grinding wheel 55. As soon as pressure is released on the foot pedal 92, the belt 34 will be tightened again.

The operator then adjusts the swingable support G into the desired angular position relative to the saw so as to grind the proper cross bevel on the saw teeth. The platform 45 and the grinder E swings with the support G. The hand wheel 84 is turned in order to retain the support G in the position to which it has been adjusted. The crank 49 is adjusted to give the proper depth to the teeth to be ground.

Motors 29 and 56 are started, and the saw-advancing mechanism D will advance the saw C periodically underneath the rotating grinding wheel 55. The wheel-elevating mechanism F raises the grinding wheel out of contact with the saw during the periods when the latter is being advanced. During the times when the saw is stationary, the mechanism F lowers the tooth grinder E so that the teeth on the saw will be ground by the grinding wheel. The operator can depress the foot pedal at any stage of the grinding in order to manually raise the tooth grinder E out of contact with the saw.

I claim:

1. In a saw grinder; means for holding a saw during grinding of the latter's teeth; a frame having a hollow shaft journalled thereon; a standard mounted on the shaft for swinging about the longitudinal axis of the shaft; a moveable platform supported by the standard and having a rotatable grinding wheel thereon; the wheel being moveable toward and away from the saw when the platform is correspondingly moved; the longitudinal axis of the shaft, when extended, passing through the point of contact between the wheel and a saw tooth being ground; the hollow shaft being provided with a slot in the wall thereof; a push rod slidably disposed in the bore of the shaft; a lift rod guided for movement in a direction paralleling the shaft; the lift rod engaging with the platform for raising the latter and thereby moving the wheel into non-grinding position when the lift rod is moved in one direction; means projecting through the slot in the hollow shaft for raising the lift rod when the push rod is raised; means for periodically advancing the saw and wheel relative to one another to present all of the saw teeth in succession to the wheel for grinding the teeth; and means for adjusting the standard, platform and wheel about said axis of the shaft into various angular positions to grind different angles of cross bevel on the saw teeth.

2. In a saw grinder; means for holding a saw during grinding of the latter's teeth; a frame having a hollow shaft journalled thereon; the shaft being swingable about its longitudinal axis; a standard secured to and swingable with the shaft; a platform swingably supported on the standard, and having a rotatable grinding wheel arranged to grind teeth on the saw when the platform is moved toward the saw; the longitudinal axis of the shaft, when extended, passing through the point of contact between the wheel and a saw tooth being ground; a lift foot on the platform offset relative to said axis of the shaft; a push rod slidably disposed in the bore of the hollow shaft; means interposed between the push rod and the lift foot for raising the latter, and thereby the platform and wheel, when the push rod is moved in one direction; and means for periodically advancing the saw and wheel relative to one another to present all of the saw teeth in succession to the wheel for grinding operations.

3. In a saw grinder; a supporting frame; a moveable saw carriage mounted on the frame;

means for clamping a saw to the carriage; a vertically-disposed shaft journalled in the frame; an inverted L-shaped standard having a vertical leg supported by the shaft and swingable about the longitudinal axis of the shaft; the standard having a horizontal leg; a swingable platform hinged to the latter leg for up and down movement relative thereto; a rotatable grinding wheel carried by the platform and overlying the clamped saw; the wheel being moveable toward and away from the saw when the platform is correspondingly moved; the longitudinal axis of the shaft, when extended, passing through the point of contact between the wheel and a saw tooth being ground; means for raising and lowering the platform, and thereby moving the wheel into non-grinding and grinding positions, respectively; means for periodically advancing the carriage and clamped saw beneath the wheel to present all of the saw teeth to the wheel for grinding the teeth; and means for adjusting the standard, platform and wheel as a unit about said axis of the shaft into various angular positions to grind different angles of cross bevel on the saw teeth.

4. In a saw grinder; a supporting frame; a moveable saw carriage mounted on the frame; means for clamping a saw to the carriage; a vertically-disposed shaft journalled in the frame; an inverted L-shaped standard having a vertical leg supported by the shaft and swingable about the longitudinal axis of the shaft; the standard having a horizontal leg; a swingable platform hinged to the latter leg for up and down movement relative thereto; a rotatable grinding wheel carried by the platform and overlying the clamped saw; the wheel being moveable toward and away from the saw when the platform is correspondingly moved; the longitudinal axis of the shaft, when extended, passing through the point of contact between the wheel and a saw tooth being ground; means for raising and lowering the platform, and thereby moving the wheel into non-grinding and grinding positions, respectively; means for periodically advancing the carriage and clamped saw beneath the wheel to present all of the saw teeth to the wheel for grinding the teeth; the standard, platform and wheel being adjustable as a unit about said axis of the shaft into various angular positions to grind different angles of cross bevel on the saw teeth; a top fixed to the frame and overlying said horizontal leg of the standard; the top having a curved edge with its center of curvature located on said axis; and means guided in the horizontal leg of the standard and moveable into braking engagement with said curved edge for retaining the standard in adjusted position.

5. In a saw grinder; means for holding a saw during grinding of the latter's teeth; a frame having a hollow shaft journalled thereon; the shaft being swingable about its longitudinal axis; a standard secured to and swingable with the shaft; a platform swingably supported on the standard, and having a rotatable grinding wheel arranged to grind teeth on the saw when the platform is moved toward the saw; the longitudinal axis of the shaft, when extended, passing through the point of contact between the wheel and a saw tooth being ground; a lift foot on the platform offset relative to said axis of the shaft; a push rod slidably disposed in the bore of the hollow shaft; means for periodically raising and lowering the push rod; a lift rod guided for movement in a direction paralleling the shaft and engaging with said lift foot for raising the latter and thereby moving the wheel into non-grinding position when the lift rod is moved in one direction; means interconnecting the lift rod with the push rod for raising the former when the latter is raised; and means for periodically advancing the saw and wheel relative to one another to present all of the teeth in the saw to the wheel for grinding operations.

6. In a saw grinder; means for holding a saw during grinding of the latter's teeth; a frame having a hollow shaft journalled thereon; the shaft being swingable about its longitudinal axis; brackets secured to the shaft and swingable therewith; a standard secured to the brackets; a platform swingably supported on the standard, and having a rotatable grinding wheel arranged to grind teeth on the saw when the platform is moved toward the saw; the longitudinal axis of the shaft, when extended, passing through the point of contact between the wheel and a saw tooth being ground; a lift foot on the platform offset relative to said axis of the shaft; a push rod slidably disposed in the bore of the hollow shaft; means for periodically raising and lowering the push rod; a lift-rod paralleling the shaft and guided in bearings in the brackets; the lift rod engaging with said lift foot for raising the latter and thereby moving the wheel into non-grinding position when the lift rod is moved in one direction; means interconnecting the lift rod with the push rod for raising the former when the latter is raised; and means for periodically advancing the saw and wheel relative to one another to present all of the teeth in the saw to the wheel for grinding operations.

JOHN R. CHRYST.

REFERENCES CITED

The following references are of record in the file of this patent:

UNITED STATES PATENTS

| Number | Name | Date |
|---|---|---|
| 574,855 | Schofield | Jan. 5, 1897 |
| 1,264,528 | Keil | Apr. 30, 1918 |
| 1,491,706 | Klin | Apr. 22, 1924 |
| 1,501,564 | Lifflander | July 15, 1924 |
| 1,874,315 | Laurent | Aug. 30, 1932 |
| 1,970,864 | Nosan | Aug. 21, 1934 |
| 2,333,298 | Daggett | Nov. 2, 1943 |